United States Patent [19]
Borman et al.

[11] 3,886,104
[45] May 27, 1975

[54] STABILIZED POLYESTER COMPOSITIONS

[75] Inventors: Willem F. H. Borman; Eugene P. Reilly, both of Pittsfield, Mass.

[73] Assignee: General Electric Company, Pittsfield, Mass.

[22] Filed: Jan. 5, 1973

[21] Appl. No.: 321,267

[52] U.S. Cl....... 260/22 EP; 260/40 R; 260/45.8 A; 260/835
[51] Int. Cl..................... C08g 17/00; C08g 51/58
[58] Field of Search............ 260/22 EP, 75 EP, 835, 260/45.8 A

[56]  References Cited
UNITED STATES PATENTS

| | | | |
|---|---|---|---|
| 2,949,441 | 8/1960 | Newey | 260/75 EP |
| 2,963,455 | 12/1966 | Rowland et al. | 260/45.8 A |
| 3,073,796 | 1/1963 | Reich et al. | 260/75 EP |
| 3,182,035 | 5/1965 | Garman | 260/45.8 A |
| 3,200,131 | 8/1965 | Greenbaum | 260/45.8 A |
| 3,558,539 | 1/1971 | Irish | 260/45.8 A |
| 3,578,620 | 5/1971 | Prucnal | 260/45.8 A |
| 3,621,074 | 11/1971 | Siggel et al. | 260/835 |
| 3,624,180 | 11/1971 | Schmid et al. | 260/75 EP |
| 3,627,867 | 12/1971 | Schwarz | 260/75 EP |
| 3,660,320 | 5/1972 | Johnson et al. | 260/45.8 A |
| 3,661,825 | 5/1972 | Horvath et al. | 260/45.8 A |
| 3,723,569 | 3/1973 | Hoeschele | 260/835 |

*Primary Examiner*—Ronald W. Griffin
*Attorney, Agent, or Firm*—William F. Mufatti; George B. Finnegan, Jr.; Rocco S. Barrese

[57] ABSTRACT

High molecular weight polyesters, such as poly(alkylene terephthalates), are stabilized against deterioration by heat, oxidation, and the like, with a stabilizer comprising an organic compound containing only carbon, hydrogen and oxygen and having at least two internal epoxide groups. Also provided are reinforced embodiments of the stabilized compositions.

24 Claims, No Drawings

STABILIZED POLYESTER COMPOSITIONS

The present invention is concerned with thermoplastic polyester compositions. More particularly, it relates to polyesters which have been stabilized against deterioration due, e.g., to heat, molecular oxidation and/or light.

BACKGROUND OF THE INVENTION

High molecular weight linear thermosplastic polyesters, such as poly(ethylene terephthalate) and poly(1,4-butylene terephthalate) are well known as film and fiber-formers and they are provided by methods outlined in Whinfield et al, U.S. Pat. Nos. 2,465,319, and Pengilly, 3,047,539, and elsewhere.

Polyester resins, such as poly(alkylene terephthalates, isophthalates and mixed iso- and terephthalates), particularly poly(1,4-butylene terephthalate), also provide excellent molding compositions because they can be fabricated with moderate stock temperatures, low mold temperatures and rapid cycle times. Because of their unusual combination of properties, these resins are superior in chemical resistance, thermal stability and product appearance (they have a smooth, glossy finish). Such resins also have superior strength, stiffness, low friction and wear properties and good resistance to brittle fracture. The polyester resins can also be provided in reinforced embodiments.

Solid polyester resins of the type mentioned have found extensive use in various forms of thermoplastic structures. Many different articles of manufacture are produced from polyester compositions by molding and shaping at higher temperatures because they remain relatively rigid at ordinary room temperature. Polyester fibers are also useful in woven articles and films therefrom are both useful as mechanical supports and as barriers and also they have useful protective coating applications. Although the thermoplastic molding and coating compositions have the outstanding properties mentioned above, they unfortunately are subject to polymeric degradation during processing due to thermal and oxidation instability of the polyester component. Deterioration caused by heat and/or oxygen will lead to loss of electrical properties and/or to discoloration, embrittlement, and especially loss of physical properties such as tensile strength and impact strength. Additionally, discoloration, which is undesirable in some uses, may occur if the polyester resin composition is not stabilized with proper amounts and kinds of stabilizers.

Poly(alkylene terephthalates) and particularly poly(1,4-butylene terephthalate) undergo a gradual degradation due to thermal decomposition during processing, e.g., extrusion, compounding and molding. This degradation is due to thermal scission and is accompanied by a decrease in melt viscosity and a deterioration of the polyester's physical and mechanical properties. Thermal scission can be observed experimentally by a drop in melt viscosity in instruments such as an extrusion plastometer or melt indexer (e.g., ASTM D-1238), in which the molten material is forced through a standard orifice and the rate of extrusion (e.g., unit weight recovered in a fixed time) is measured and recorded. Typically, degradation in chain length due to thermal scission is reflected in a higher melt index. If the data are numerically expressed as, for example, a decrease in the logarithm of the melt viscosity per minute time $[\Delta(\log \eta)/\Delta t]$, the so-called degradation constant is provided and this can be compared with controls. Typical values for the degradation constant of poly(1,4-butylene terephthalate) are $6 \times 10^{-3}$ min.$^{-1}$ (250°C.); $12 \times 10^{-3}$ min.$^{-1}$ (260°C.); and $24 \times 10^{-3}$ min.$^{-1}$ (270°C.).

Detailed methods will be described hereinafter.

Commonly used stabilizers, such as hindered phenolic type antioxidants and phosphite chelators improve the long-term oxidative stability of the polyester resins below the resin's melting point, but have no effect whatsoever on the melt stability as defined above.

Surprisingly, however, it has now been found that small amounts of internally polyfunctional epoxides act to vastly improve the melt stability of polyester resins. Typically, the degradation constants, as above defined, are markedly decreased (and even caused to assume negative values due to an increase in melt viscosity), when 0.2, 0.5, 1.0, 2.0, etc., parts by weight of an organic compound containing only carbon, hydrogen and oxygen and having at least two internal epoxide groups, is added to 100 parts by weight of the polyester resin.

In addition to stabilizing the melt viscosity, the polyepoxidized compounds also retarded discoloration of the polyester composition due to thermal oxidation of the melt.

It is, accordingly, a principal object of the invention to provide stabilized compositions of normally unstable polyester resins, which are normally rigid at room temperature. It is another object of the invention to provide subh stabilized compositions by incorporating in a normally unstable high molecular weight polyester resin a minor portion of a stabilizer which comprises an internally polyfunctional epoxide. It is a further object to provide reinforced embodiments of such stabilized compositions.

DESCRIPTION OF THE INVENTION

The above-mentioned objects and advantages are secured according to the present invention with stabilized compositions comprising a high molecular weight polyester resin normally tending to undergo thermal scission and a stabilizing quantity of an organic compound containing only carbon, hydrogen and oxygen and having at least two internal epoxide groups.

A preferred feature of this invention is to provide reinforced thermoplastic compositions comprising A. a stabilized polyester resin composition as defined above and B. a reinforcing amount of a reinforcing filler or a mixture of such fillers for said combination.

Another preferred feature is to provide stabilized and reinforced, stabilized compositions as above defined which also include small effective amounts of organic phosphites as costabilizers.

The term "high molecular weight polyester normally tending to undergo thermal scission" includes, in general, linear saturated condensation products of diols and dicarboxylic acids, or reactive derivatives thereof. Preferably, there will comprise condensation products of aromatic dicarboxylic acids or esters and aliphatic diols. It is to be understood that it is also possible to use polyesters such as poly(1,4-dimethylolcyclohexane dicarboxylates, e.g., terephthalates). In addition to phthalates, small amounts, e.g., from 0.5 to 15 percent by weight, of other aromatic dicarboxylic acids, such as naphthalene dicarboxylic acid, or aliphatic dicarboxylic acids, such as adipic acid, can also be present in preferred compositions. The diol constituent can likewise be varied, in the preferred embodiments, by adding small amounts of cycloaliphatic diols.

Preferred polyesters will be of the family consisting of high molecular weight, polymeric glycol terephthalates or isophthalates having repeating units of the general formula

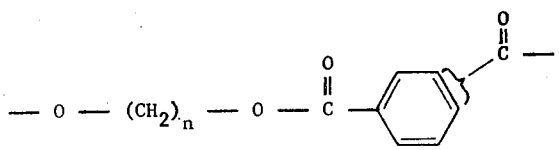

wherein $n$ is a whole number of from 2 to 10, preferably from 2 to 4, and mixtures of such esters, including copolyesters terephthalic and isophthalic acids of up to about 30 mol. percent isophthalatic units.

The molecular weight of the polyester component should be sufficiently high to provide an intrinsic viscosity of about 0.6 to 2.0 deciliters per gram, preferably 0.7 to 1.6 dl./g., measured, for example, as a solution in a 60:40 mixture of phenol and tetrachloroethane at 30°C.

The stabilizers of this invention are internally polyfunctional epoxides containing only carbon, hydrogen and oxygen. They will have at least two and preferably more epoxide groups, each of the formula

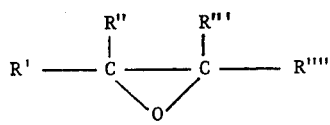

wherein the R's will represent hydrogen, alkyl, cycloalkyl, aralkyl, aryl, and the like, provided that no more than 2 of the R's are hydrogen, and if 2 R's are hydrogen they are not carried by the same carbon, and the epoxide group optionally may contain ether, ester and similar oxygen-containing functional groups. It is important that the compounds contain at least two such epoxide groups which are non-terminal (i.e., internal). In any case, the stabilizer can also have one or more terminal epoxy groups. It is preferred, because of the conditions conventionally used during compounding and processing to use such compounds which are relatively non-volatile and easy to mix, and to select those which have a molecular weight falling within the range of from about 500 to about 25,000.

Especially preferred are epoxidized polyunsaturated triglycerides, in which the internal epoxide groups are carried by the hydrocarbon portion of the esterified fatty acid. Also especially preferred are epoxidized polybutadienes, in which the internal epoxide function appear along the resin chain.

The epoxidized polyunsaturated triglycerides can be made by techniques well known to those skilled in the art. Suitable such materials are made by epoxidizing linseed oil, soybean oil, and the like, either by dehydrating a corresponding $\alpha$, $\beta$-dihydroxy compound or by introducing the expoxide linkage by treating the olefinic bonds with an epoxidizing agent, such as a peracid, e.g., peracetic acid, in well-known techniques. These are also available commercially from a number of sources. For example, Argus Chemical Corp., Brooklyn, N.Y., 11231 supplies epoxidized linseed oil under product designation, Drapex 10.4; and epoxidized soybean oil under product designation Drapex 6.8. The epoxidized soybean oil and epoxidized linseed oil are also available from Claremont Polychemical Corp., Roslyn Heights, N.Y. under product designations CLE-22 and CLE-29, respectively. Other sources for such products are set out in the Modern Plastics Encyclopedia, 1971–1972 issue, p. 655.

The epoxidized polybutadiene can be made by techniques well known to those skilled in the art. For example, polybutadiene can be treated with peracetic acid, which will introduce epoxide groups along the chain, and also in any 1,2-vinyl groups, which may be present. Such techniques are described, for example, in H. S. Makowski et al in J. Macromol. Sci., - Chem. A 4(7) 1,563–97, November, 1970.

Any effective amount of the stabilizer can be used in the compositions of this invention. In general, however, the poly-functional epoxidized stabilizer will comprise from about 0.05 to about 5.0 parts, and preferably from about 0.25 to about 2.5 parts by weight per 100 parts by weight of the unstable polyester resin component in the composition. On the same basis, if the optional organic phosphite costabilizer is present, small, effective amounts will be employed, but, in general, these will comprise from about 0.005 to about 1.0, and preferably from about 0.01 to about 0.25 parts by weight based on 100 parts by weight of said polyester.

It should be understood that the epoxidized polyunsaturated compounds are also useful to stabilize the high molecular weight polyesters in further combination with other additive agents, such as, e.g., chelating agents, antioxidants, carbon black, plasticizers, lubricity promotors, color stabilizers, ultraviolet absorbers, X-ray opacifiers, dyes, pigments, fillers, flame-retardant agents, and the like.

As has been mentioned a preferred class of compositions will comprise the stabilized polyester resin and a reinforcing amount of a reinforcing filler. In general, any reinforcement can be used, e.g., fibers, whiskers or platelets of metals, e.g., aluminum, iron or nickel, and the like, and non-metals, e.g., ceramics, carbon filaments, silicates, asbestos, $TiO_2$ and titanate whiskers, quartz, glass flakes and fibers and the like. It is to be understood that, unless the filler adds to the strength, stiffness and impact strength of the composition, it is only a filler and not a reinforcing filler as contemplated herein.

Although it is only necessary to have at least a reinforcing amount of the reinforcement present, in general, the filler will comprise from about 1 to about 80 parts by weight based on 100 parts by weight of the polyester resin component and the filler.

In particular, the preferred reinforcing fillers are of glass and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastic reinforcement are made by mechanical pulling. The filament diameters range from about 0.00012 to 0.00075 inch, but this is not critical to the present invention.

The length of the glass filaments and whether or not they are bundled into fibers and the fibers bundled in turn to yarns, ropes or rovings, or woven into mats, and the like, are also not critical to the invention. However, in preparing the present compositions, it is convenient to use the filamentous glass in the form of chopped strands of from about ⅛ to about 1 inch long, preferably less than ¼ inch long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.000005 and 0.125 inch.

In general, best properties will be obtained if the sized filamentous glass reinforcement comprises from about 1 to about 80 percent by weight based on 100 parts by weight of the polyester resin and the glass, and preferably from about 5 to about 50 parts by weight. Especially preferably the glass will comprise from about 10 to about 40 parts by weight based on 100 parts by weight of the resin and the glass. Generally, for direct molding use, up to about 60 parts by weight of glass can be present without causing flow problems. However, it is useful also to prepare the compositions containing substantially greater quantities, e.g., up to 70–80 parts by weight of glass. These concentrates can then be custom blended with blends of resins that are not glass reinforced to provide any desired glass content of a lower value.

Organic phosphite costabilizers comprise a class of compounds whose metes and bounds are well known to those skilled in the art. In general, however, the most preferred such compounds are of the formula:

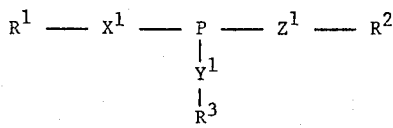

wherein $X^1$, $Y^1$, and $Z^1$ are each selected from —O— and —S— and $R^1$, $R^2$ and $R^3$ are each selected from alkyl of from 6 to 24 carbon atoms, phenyl or alkylphenyl of from 7 to 33 carbon atoms. Illustrative of groups $R^1$, $R^2$ and $R^3$ are hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, and the like, preferably iso-octyl, decyl, dodecyl and octadecyl, phenyl, or alkyl-phenyl- such as mono- or polyalkylphenyl, e.g., tolyl, dimethylphenyl, trimethylphenyl, tetramethylphenyl, pentamethylphenyl, propylphenyl, dipropylphenyl, tripropylphenyl, tetrapropylphenyl, and the like, nonylphenyl, dinonylphenyl, trinonylphenyl, and the like. The preferred costabilizers will be of the formula:

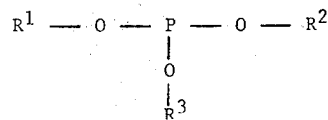

wherein $R^1$, $R^2$ and $R^3$ are as defined above, and illustratively tri-n-octadecylphosphite, tri-iso-octylphosphite, trinonylphenyl phosphite, trilauryl phosphite, trioctadecyl phosphiite, didecylphenyl phosphite, diphenyl decyl phosphite, triphenyl phosphite, and the like. The preferred stabilizers are triphenyl phosphite and tridecyl phosphite. Another preferred costabilizer is diphenyl decyl phosphite, the product designated Ferro 904, which is available commercially from Ferro Corp., Bedford, Ohio 44146.

The phosphites of the above formula are commercially available or can be readily prepared in conventional ways, e.g., by reaction of phosphorus trichloride with the corresponding alkyl, phenyl or alkylphenyl, hydroxy or mercapto compounds.

The method of blending the compositions of this invention is not critical and can be carried out by conventional techniques. One convenient method comprises blending the polyesters and the stabilizers in powder or granular form, extruding the blend and comminuting into pellets or other suitable shapes.

The reinforcement, if used, and other additives are added in any usual manner, e.g., by dry mixing or by mixing in the melted state in an extruder, on a heated mill or in other mixers.

By way of illustration, glass roving (a bundle of strands of filaments) is chopped into small pieces, e.g., ⅛ to 1 inch in length, and preferably less than ¼ in length and put into an extrusion compounder with the polyester resin and the stabilizers and, optionally, other additive(s) to produce molding pellets. The fibers are shortened and predispersed in the process, coming out at less than 1/16 inch long. In another procedure, glass filaments are ground or milled to short lengths, and are mixed with the polyester resin and stabilizers and, optionally, other additive(s) by dry blending then either fluxed on a mill and ground, or they are extruded and chopped. The glass fibers can also be mixed with resin and additives and directly molded, e.g., by injection or transfer molding techniques.

It is always important to thoroughly free all of the ingredients, the polyester resin, stabilizer, reinforcing filler, if used, from as much water as possible.

In addition, compounding should be carried out to insure that the residence time in the machine is short; the temperature is carefully controlled; the friction heat is utilized; and an intimate blend between the resin and the additives is obtained.

Although it is not essential, best results are obtained if the ingredients are precompounded, pelletized and then molded. Precompounding can be carried out in conventional equipment. For example, after carefully pre-drying the polyester resin, the stabilizers and, optionally, other additives and/or reinforcements, e.g., under vacuum at 110°C. for 12 hours, a single screw extruder is fed with a dry blend of the ingredients, the screw employed having a long transition section to insure proper melting. On the other hand, a twin screw extrusion machine, e.g., a 28 mm. Werner Pfleiderer machine can be fed with resins and additives at the feed port and reinforcement down stream. In either case, a generally suitable machine temperature will be about 450° to 600°F.

The precompounded composition can be extruded and cut up into molding compounds, such as conventional granules, pellets, etc., by standard techniques.

The compositions can be molded in any equipment conventionally used for thermoplastic compositions. For example, good results will be obtained in an injection molding machine, e.g., of the Newbury type, with conventional cylinder temperatures, e.g., 500°F. and conventional mold temperatures, e.g., 150°F. If necessary, depending on the molding properties of the polyester, the amount of additives and/or reinforcing filler and the rate of crystallization of the polyester component, those skilled in the art will be able to make the conventional adjustments in molding cycles to accommodate the composition.

DESCRIPTION OF THE PREFERRED EMBODIMENTS

The following examples illustrate the preparation of certain compositions within the scope of this invention. They are not to be construed to limit the invention in any manner whatsoever. All parts, except as otherwise indicated, are by weight.

The rheometer used in Example 1 is an "Automatic Capillary Rheometer," built by Monsanto Research Corporation, Dayton, Ohio, according to a design by Dr. Samuel Steingiser. It consists of an electrically heated steel cylinder with a removable die at the lower end and a pneumatically driven piston operating within the cylinder.

By a proper choice of orifice dimensions and piston loading, it is possible to cover a wide range of shear stresses under which to measure the melt viscosity of the test specimen.

The rheometer is equipped with 2 sets of four timers. The first set (Type I) is adjusted and is used to automatically initiate a melt viscosity determination. The second set (Type II) measures the time required to extrude a fixed amount of polymer during each of the four determinations.

When the first timer of type I reaches zero (runs out) the piston is activated through relay-operated valves, allowing compressed gas of pre-determined pressure to enter the pneumatic cylinder and exert a downward force of known magnitude on the piston. Through the action of a calibrated cam, operating limitswitches and relays, a small amount of polymer is forced from the barrel, after which an automatic timer of type II established the time required to extrude a constant volume of molten polymer. The pressure is then released from the pneumatic cylinder until the next timer of type I returns to zero, causing the process to repeat itself. Upon completion of the four cycles, the four type II extrusion timers are read and their readings used to calculate melt viscosity and shear rate at the four predetermined elapsed time periods. This allows back-extrapolation of melt viscosity to zero heating time to eliminate the effect of thermal degradation on the melt viscosity determination.

This back-extrapolation is most conveniently done on semilog graph paper, on which melt viscosity is plotted on the logarithmic scale, since a straight line will result whenever the polymer undergoes a normal degradation. The slope of the extrapolation line, representing the ratio of [$\Delta$ log (melt viscosity)/$\Delta$ time] is a measure of polymer stability, and its negative value may be used as a "degradation constant." In this case, a value of the degradation constant =0 indicates a stable melt viscosity and no degradation.

A positive value indicates a decreasing melt viscosity, presumably due to degradation. A negative value of the degradation constant, on the other hand, indicates an increasing melt viscosity with time, possibly due to further polymerization, branching, cross-linking, etc.

Calculation of the melt viscosity and shear rate is based on well known equations, using orifice diameters, pressue drop across the orifice, and measurement of extrusion rate.

The relations used for the calculations can be found, amongst others, in table I of ASTM method D 1703-62.

EXAMPLE 1

Four compositions prepared comprising 100 parts of poly(1,4-butylene terephthalate), intrinsic viscosity about 1.0 dl./g., and 0.2, 0.5, 1.0 and 2.0 parts of epoxidized linseed oil (Argus Chemical Corp., Drapex 10.4). The compositions are heated and the melt viscosity is measured in a capillary rheometer. The data are calculated in the form of a degradation constant calculated from the change in melt viscosity during the first 10 minutes of exposure in the plastometer. The degradation constant is expressed as [$\Delta(\log\eta)\Delta t$] and the date are presented in Table 1:

Table 1

Melt Stability of Compositions of Poly(1,4-butylene terephthalate) and Epoxidized Linseed Oil

| Stabilizer | Amount (%) | Degradation Constant ($\times 10^3$) | | |
|---|---|---|---|---|
| | | T = 250°C. | T = 260°C. | T = 270°C. |
| epoxidized linseed oil | 0.2 | 3.8 | N.D.* | N.D. |
| do. | 0.5 | 0.4 | 4.6 | 22 |
| do. | 1.0 | −2.8** | 0 | 12.3 |
| do. | 2.0 | −6.5 | −6.3 | 8.3 |
| none | — | 7.3 | 13.1 | 23.4 |

*not determined for this composition
**a negative value indicates an increase in melt stability.

The results indicate that the compositions are efficiently stabilized. The resin control is seen to undergo a typical deterioration under the influence of heat.

EXAMPLE 2

The procedure of Example 1 is repeated using 1.0 part of epoxidized linseed oil and including 0.05 part of mixed phenyl decyl phosphite chelator (Ferro-904) as costabilizers. The degradation constants ($\times 10^{-3}$) are −3.3 min.$^{-1}$ (250°C.); 0 (260°C.) and 13.7 (270°C.). The beneficial effect of the epoxidized linseed oil is seen to be somewhat increased at 250°C. with the costabilizer.

EXAMPLE 3

The procedure of Example 1 is repeated using 1.0 part of epoxidized soybean oil (Argus Chemical Corp., Drapex 6.8) as the stabilizer. The degradation constants ($\times 10^3$) are 0 (250°C.); and 7.4 min.$^{-1}$ (260°C.). The results indicate that the compositions are efficiently stabilized (in comparison, for example, with the data for the polyester resin alone, as set forth in Table 1).

EXAMPLE 4

The procedure of Example 1 is repeated using 1.0 part of epoxidized polybutadiene (Mol. wt. about 2,000, prepared by peracetic acid epoxidation of polybutadiene, FMC Corp., Oxiron 2000), as the stabilizer. The degradation constants ($\times 10^3$) are $-1.1$ min.$^{-1}$(250°C.) and 9.8 min.$^{-1}$ (260°C.). The results indicate that the compositions are efficiently stabilized (in comparison, for example, with the data for the polyester alone, as set forth in Table 1).

EXAMPLE 5

In an extruder operated at 470°F., are blended, respectively, 100 parts by weight of unstabilized poly(1,4-butylene terephthalate), and 1 part by weight of epoxidized linseed oil, epoxidized soybean oil and epoxidized polybutadiene. The three blended compositions are injection molded into parts which are subjected to physical propery tests as molded. In comparison with unstabilized controls, work pieces with excellent retention of physical and mechanical properties are obtained.

EXAMPLE 6

In an extruder operated at 470°F. are blended, respectively, 69.8 parts of unstabilized poly(1,4-butylene terephthalate), intrinsic viscosity, 1.0 dl./g., 30 parts by weight of ⅛ inch chopped filamentous glass reinforcement and 0.5 parts of epoxidized linseed oil, epoxidized soybean oil and epoxidized polybutadiene. The three blended compositions are injection molded into test pieces which are subjected to physical testing. In comparison with unstabilized controls, reinforced work pieces with excellent retention of physical and mechanical properties are obtained.

EXAMPLES 7 AND 8

Compositions comprising poly(1,4-butylene terephthalate) and the indicated quantities of stabilizers are prepared and molded in a reciprocating screw injection molding machine. For comparison purposes, poly(1,4-butylene terephthalate), without additives is molded under identical conditions. The physcial properties of the molded pieces are determined by standard procedures. The formulations employed and the results obtained are summarized in Table 2:

compositions within the scope of this invention.

For example, for poly(1,4-butylene terephthalate), substitute poly(ethylene terephthalate); a 98/2 1,4-butylene terephthalate-1,4-butylene isophthalate copolyester; a 99/1 1,4-butylene terephthalate-1,4-butylene adipate copolyester; or a 98/2 1,4-butylene terephthalate-glycerol terephthalate copolyester.

For the glass fibers, the following reinforcing fillers can be substituted: aluminium powder; asbestos fibers; silicate; bronze powder; ceramic fibers; titanate fibers; quartz and carbon black.

For the epoxidized linseed oil or epoxidized soybean oil, substitute: epoxidized cottonseed oil, epoxidized peanut oil, epoxidized corn oil; epoxidized safflower-seed oil; the epoxidized triglyceride of linoleic acid and the epoxidized triglyceride of linolenic acid.

Because of their excellent physical, mechanical, chemical, electrical and thermal properties, the polyester compositions of this invention have many and varied uses. The compositions may be used alone as molding powders or mixed with other polymers and may contain additional, non-reinforcing fillers, such as wood flour, cloth fibers, clays and the like, as well as flame retardant agents, pigments, dyes, stabilizers, plasticizers, and the like.

Obviously, other modifications and variations of the present invention are possible in the light of hte above teachings. It is, therefore, to be understood that changes may be made in the particular embodiments of this invention described which are within the full intended scope of the invention as defined by the appended claims.

We claim;

1. A stabilized thermoplastic composition comprising
   i. a high molecular weight linear polyester resin normally tending to undergo thermal scission, said resin having repeating units of the general formula $$- O - (CH_2)_n - O - \overset{O}{\underset{\|}{C}} - \underset{\diagup\!\diagdown}{\bigcirc} - \overset{O}{\underset{\|}{C}} -$$

Table 2

| Example | Melt-stabilized Polyester Resin Compositions | | |
|---|---|---|---|
| | 7 | 8 | 8C* |
| Formulation (parts by weight) | | | |
| poly(1,4-butylene terephthalate) | 99.00 | 98.95 | 100.0 |
| epoxidized linseed oil ** | 1.00 | 1.00 | — |
| mixed phenyl-decyl phosphites *** | — | 0.05 | — |
| Properties | | | |
| tensile strength, psi | 7050 | 7010 | 7210 |
| elongation, % | 237 | 277 | 181 |
| Gardner falling dart impact | | | |
| strength, in.-lbs. | 348 | 432 | 252 |

\* - control. no additives.
\*\* - Argus Chemical Co., Drapex 10.4
\*\*\* - Ferro Corp., Product 904

The parts made from the stabilized composition have excellent appearance and much enhanced ductility as measured by impact strength and elongation.

Other modifications of the above examples provide wherein $n$ is a whole number of from 2 to 10 and
   ii. a stabilizing quantity of an organic compound containing only carbon, hydrogen and oxygen and having at least two internal epoxide groups.

2. A stabilized composition as defined in claim 1 wherein the stabilizer has a molecular weight in the range of from about 500 to about 25,000.

3. A stabilized composition as defined in claim 1 wherein the stabilizer is an epoxidized polyunsaturated triglyceride or an epoxidized polybutadiene.

4. A stabilized composition as defined in claim 3 wherein the stabilizer is epoxidized linseed oil.

5. A stabilized composition as defined in claim 3 wherein the stabilizer is epoxidized soybean oil.

6. A stabilized composition as defined in claim 3 wherein the stabilizer is epoxidized polybutadiene.

7. A stabilized composition as defined in claim 1 wherein in said polyester resin $n$ is from 2 to 4.

8. A stabilized composition according to claim 7 wherein said polyester resin is poly(1,4-butylene terephthalate).

9. A stabilized composition as defined in claim 1 wherein the stabilizer comprises from about 0.05 to about 5.0 parts by weight per 100 parts by weight of the polyester resin component in said composition.

10. A stabilized composition as defined in claim 1 wherein said polyester resin is poly(1,4-butylene terephthalate) and the stabilizer is epoxidized linseed oil, epoxidized soybean oil or epoxidized polybutadiene and comprises from about 0.25 to about 2.5 parts by weight per 100 parts by weight of the polyester resin component in said composition.

11. A stabilized composition as defined in claim 1 which also includes a small, effective costablizing amount of an organic phosphite compound.

12. A reinforced stabilized thermoplastic composition comprising
A. a stabilized composition comprising
  i. a high molecular weight linear polyester resin normally tending to undergo thermal scission, said resin having repeating units of the general formula

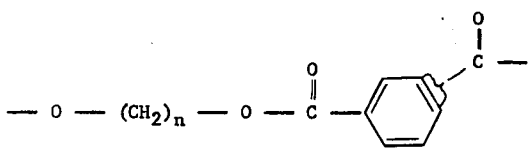

wherein $n$ is a whole number of from 2 to 10 and
  ii. a stabilizing quantity of an organic compound containing only carbon, hydrogen and oxygen and having at least two internal epoxide groups; and
B. a reinforcing amount of a reinforcing filler for said stabilized composition.

13. A reinforced stabilized composition as defined in claim 12 wherein the stabilizer has a molecular weight in the range of from about 500 to about 25,000.

14. A reinforced stabilized composition as defined in claim 12 wherein the stabilizer is an epoxidized polyunsaturated triglyceride or an epoxidized polybutadiene.

15. A composition as defined in claim 14 wherein the stabilizer is epoxidized linseed oil.

16. A composition as defined in claim 14 wherein the stabilizer is epoxidized soybean oil.

17. A composition as defined in claim 14 wherein the stabilizer is epoxidized polybutadiene.

18. A composition as defined in claim 12 wherein the reinforcing filler B comprises from about 1 to about 80 parts by weight based on 100 parts by weight of the polyester resin component and the filler.

19. A composition as defined in claim 12 wherein said polyester resin is poly(1,4-butylene terephthalate).

20. A composition as defined in claim 12 wherein reinforcing filler B is selected from the group consisting of reinforcing metals, ceramics, silicates, quartz, glass and carbons.

21. A composition as defined in claim 20 wherein said reinforcing filler is filamentous glass, in an amount of from about 1 to about 80 parts by weight based on 100 parts by weight of the polyester resin component and the glass.

22. A reinforced, stabilized composition as defined in claim 12 wherein the stabilizer comprises from about 0.05 to about 5.0 parts by weight per 100 parts by weight of said polyester resin and said reinforcing filler B is filamentous glass and comprises from about 5 to about 50 parts by weight based upon 100 parts by weight of the polyester resin and the glass.

23. A reinforced, stabilized composition as defined in claim 12 wherein said polyester resin is poly(1,4-butylene terephthalate); the stabilizer is epoxidized linseed oil, epoxidized soybean oil or epoxidized polybutadiene and comprises from about 0.25 to about 2.5 parts by weight per 100 parts by weight of said polyester resin; and said reinforcing filler is filamentous glass, in an amount of from about 10 to about 40 parts by weight based upon 100 parts by weight of the polyester resin and the glass.

24. A reinforced, stabilized composition as defined in claim 12 which also includes a small, effective costabilizing amount of an organic phosphite compound.

* * * * *